R. C. GORHAM.
CHEESE CUTTER.
APPLICATION FILED JULY 1, 1920.
1,385,372.
Patented July 26, 1921.
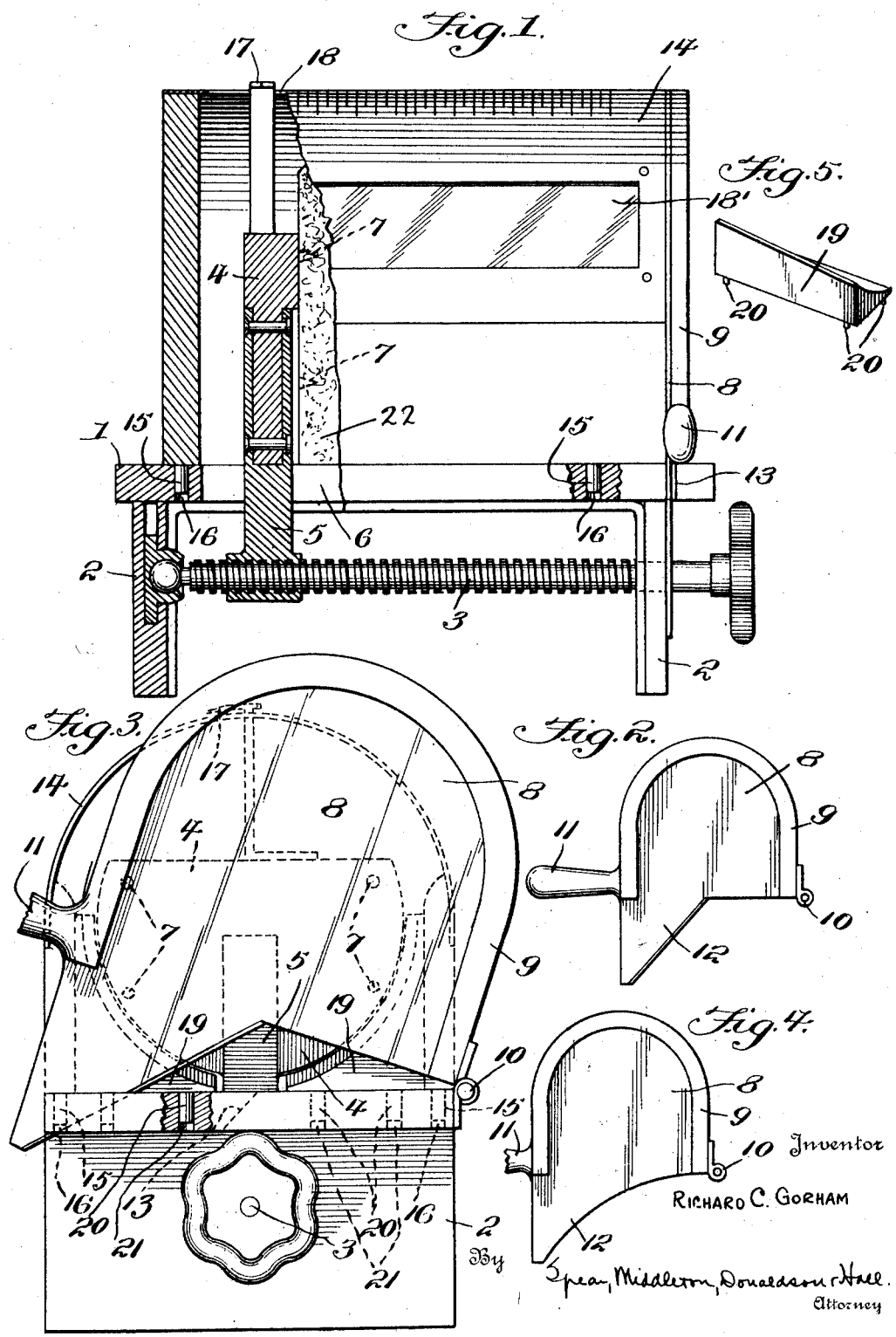
Inventor
RICHARD C. GORHAM
By Spear, Middleton, Donaldson & Hall.
Attorney

UNITED STATES PATENT OFFICE.

RICHARD C. GORHAM, OF KIRKLIN, INDIANA.

CHEESE-CUTTER.

1,385,372.  Specification of Letters Patent.  Patented July 26, 1921.

Application filed July 1, 1920. Serial No. 393,255.

*To all whom it may concern:*

Be it known that I, RICHARD C. GORHAM, a citizen of the United States, and resident of Kirklin, Indiana, have invented certain new and useful Improvements in Cheese-Cutters, of which the following is a specification.

This invention relates to a device for cutting plastic solids such as butter, cheese, etc., and is designed to be of such a compact form that it may readily be placed on the counter of a store to dispense the cheese or butter as required.

One object of my invention is to provide a cutter which will indicate the amount of cheese passing under the knife.

Another object is to provide a device which is readily adapted to cut either "long horn" or "brick" cheeses.

Still another object is to provide a cutter having a knife which cuts the cheese in such a manner as to prevent crumbling of the main body of material.

Other objects and advantages will appear as the description proceeds and my invention consists in the novel arrangement, construction and combination of parts more fully hereinafter described and pointed out in the claim.

In the drawing—

Figure 1 is a side view of the preferred form of my device.

Fig. 2 is a view of one form of knife used with my device.

Fig. 3 is a front view of the device showing the knife finishing a downward stroke.

Fig. 4 is a view of a modification of a knife blade.

Fig. 5 is a view of the insert for long horn cheeses.

The preferred form of my cheese cutter consists of a base 1 provided with supporting legs or members 2. Suitably supported by one of the members 2 and penetrating the other member is the force screw 3 terminating at the front in a crank, wheel, or any irregular knob which will facilitate the rotation thereof. Mounted upon screw 3 intermediate members 2 is the movable block 4, provided with a downwardly extending portion 5, threaded to receive screw 3 and penetrating base 1 through recess 6. An indicator 17 is suitably attached to block 4 to penetrate the housing and move with the block for a purpose specified hereafter. The threads of screw 3 are given a pitch so that any desired number of revolutions of the crank or wheel will produce a desired amount of movement of the cheese. The block 4 may be provided with spikes 7 to insure the cheese being held rigidly thereby.

A knife 8 is provided at the front of the device for slicing the cheese and consists of a frame 9 hinged to the base 1 at 10 and having a handle portion 11.

Suitably mounted in the frame is the knife member 8 which is provided with a downwardly extending portion 12. As shown in Fig. 3 this has an angular shape although an arc shaped blade may be used as in Fig. 4. In all cases, the downwardly extending portion is situated adjacent the handle and away from the hinge for a purpose more fully explained hereafter. The base 1 is provided with a recess 13 to receive the portion 12 of the blade when the stroke thereof is finished.

A housing 14 of any suitable material and preferably of a shape having a plane bottom with a substantially semicylindrical top is provided with projecting pins 15 adapted to enter recesses 16 in the base when the housing covers the cheese. A slot is provided in the housing 14 at 18 and the sides thereof are graduated in say divisions of $\frac{1}{4}$ inch. The indicator 17 rides in this slot and indicates the amount of cheese forced under the knife, when the wheel is rotated.

A window of celluloid or other suitable material is shown at 18' to allow the operator to see the amount of cheese remaining in the machine.

Concave strips 19 are provided with projecting pins 20, to seat in recesses 21 in the base for the purpose of adapting the flat base to take the convex side of a "long horn" cheese. This type of cheese is usually of smaller diameter at one end than the other, so the strips 19 are made slightly larger at the back to take the small end of the cheese and allow the whole to lie as nearly horizontal as possible. These strips are readily removable to permit the cutter to receive a square cheese when desired.

In operation a cheese 22 is placed on the base 1 with spikes of the block 4 embedded in the rear thereof and the screw rotated to bring the end of the cheese flush with the cutting blade. The knife is then lifted and the screw rotated until the desired amount of cheese as shown by indicator 17 has passed under the knife. The blade is then brought down and it will be seen that near the end of its stroke, the cutting pressure is directed toward the main body of cheese. This prevents breaking of the corners in soft or crumbly cheeses which is a great factor, as usually these broken pieces are wasted.

It will now be seen that this device provides means whereby a predetermined amount of cheese may be forced under the knife and the cheese sliced without waste. Also by the removal or replacement of strips 19 the device may be quickly made to receive either round or square cheeses. The readily removable housing permits instant access to the interior of the device for washing purposes etc., and yet when the cutting blade is in its downward position the cheese or like material is rat or vermin proof.

Various changes and modifications will occur to those skilled in the art and may be practised without departing from the spirit of my invention, therefore I do not wish the drawings to be taken in a limiting sense, but as illustrative of the preferred form of carrying out my invention.

What I claim is—

In a device for vending an article of merchandise in portions, a base, a knife for severing said portions hinged to said base, said knife having two cutting edges, one of said edges lying substantially parallel with the base when the knife is at the end of a stroke, the other extending below the plane of the base.

In testimony whereof, I affix my signature.

RICHARD C. GORHAM.